(12) United States Patent
Relats et al.

(10) Patent No.: US 8,557,073 B2
(45) Date of Patent: Oct. 15, 2013

(54) METHOD OF PRODUCING PROTECTIVE TUBES

(75) Inventors: Jordi Relats, Caldes de Montbui (ES);
Pere Relats, Caldes de Montbui (ES);
Dolors Artola, Caldes de Montbui (ES);
Anna Fruns, Caldes de Montbui (ES)

(73) Assignee: Relats, S.A., Caldes de Montbui (Barcelona) (ES)

( * ) Notice: Subject to any disclaimer, the term of this patent is extended or adjusted under 35 U.S.C. 154(b) by 1493 days.

(21) Appl. No.: 10/589,485

(22) PCT Filed: May 12, 2005

(86) PCT No.: PCT/ES2005/000256
§ 371 (c)(1),
(2), (4) Date: Aug. 15, 2006

(87) PCT Pub. No.: WO2005/108845
PCT Pub. Date: Nov. 17, 2005

(65) Prior Publication Data
US 2007/0169876 A1    Jul. 26, 2007

(30) Foreign Application Priority Data
May 12, 2004 (ES) .................................. 200401135

(51) Int. Cl.
*B32B 37/00* (2006.01)

(52) U.S. Cl.
USPC ........................................ 156/148; 156/200

(58) Field of Classification Search
USPC .................... 156/200, 196, 463, 148, 149
See application file for complete search history.

(56) References Cited

U.S. PATENT DOCUMENTS

| | | | | | |
|---|---|---|---|---|---|
| 4,477,693 | A | * | 10/1984 | Krabec et al. | 174/36 |
| 4,631,098 | A | * | 12/1986 | Pithouse et al. | 156/86 |
| 5,000,228 | A | * | 3/1991 | Manent et al. | 138/124 |
| 6,649,828 | B2 | * | 11/2003 | Rockney et al. | 174/36 |
| 2002/0162364 | A1 | * | 11/2002 | Relats et al. | 66/170 |
| 2005/0124249 | A1 | * | 6/2005 | Uribarri | 442/304 |

FOREIGN PATENT DOCUMENTS

EP    0947621 A2 * 10/1999

* cited by examiner

*Primary Examiner* — Jeff Aftergut
(74) *Attorney, Agent, or Firm* — Nath, Goldberg & Meyer; Jerald L. Meyer; Stanley N. Portigal

(57) ABSTRACT

The invention relates to a method of producing protective tubes. The inventive method comprises the following steps consisting in: producing a plurality of flat warp knit bands using a Rachel loom; and shaping said flat bands such that the longitudinal ends of each flat band join together and overlap each other, thereby forming a tubular shape. The inside diameter of the tube and the overlapped segment can be controlled and defined by the method and said inside diameter can be virtually limitless.

10 Claims, 5 Drawing Sheets

METHOD OF PRODUCING PROTECTIVE TUBES

The invention refers to a method for the manufacture of protective tubes, said tubes being formed by a plurality of threads linked to each other.

BACKGROUND TO THE INVENTION

Cars, on being subject to vibration, produce noises that disturb the occupants of the vehicle. Some of these noises are produced by the cables on knocking against the vehicle bodywork as a result of said vibrations. The vibrations also cause wear to the cables and, consequently, of the protective tube.

In order to prevent these nuisances for some time protective tubes have been used that cover the vehicle cables and absorb the noise.

These protective tubes are made from braided threads of plastic materials, which have the advantage of being very elastic and of adapting to different cable diameters. In order to provide the protective tube with the characteristics necessary to absorb the noise, these tubes also include threads of a texturised material.

In patent ES-A-2.210.854, belonging to the same owner as this present application, an insulating tube is described that is formed from different types of threads that allow the combination of elasticity and noise absorption, in addition to resistance to abrasion and temperature.

Due to the increase of cabling in cars, resulting from the ever increasing incorporation of electrical and/or electronic equipment, the applicant has come up against the problem that until this time was unknown, this being the limited diameter of said protective tubes.

The applicant has come to the conclusion that if protective tubes could be made with a greater diameter more cable could be passed through each tube, making the assembly of the vehicle electrics easier. However, with the current manufacturing machines the manufacture of protective tubes with a greater diameter is not viable.

This impossibility is due to the fact that current machines have a circular head fitted with a plurality of needles. This head is surrounded by thread guides that feed a thread to each needle. From this machine it is clear that there is a space limitation for the amount of threads that are necessary to make tubes with a greater diameter. In addition this machine is specially designed for the manufacture of protective tubes with small diameters, as it was considered to be the most suitable solution up to the present time.

On the other hand, the warp knitting machines, such as the Raschel type knitting machines have been known for some time, but their field of application is usually a long way from the car industry.

For example, U.S. Pat. No. 4,784,886 describes a knitted fabric made on a flat bed machine with laying of the yarn. However, in said document, no procedure is described for the manufacture of said fabric.

Patents U.S. Pat. No. 5,413,149, U.S. Pat. No. 5,556,495, EP 0425 099 and WO97/32067 describe flat or open fretwork fabrics, and also make reference to a shaping process. However, at no time do they describe the use of a Raschel loom.

DESCRIPTION OF THE INVENTION

The invention procedure overcomes the stated disadvantages, and showing other advantages that will be described.

In the first place, it must be understood that in the present description using the term "protective tube", a textile structure is described formed from a band, which, by means of the invention procedure, forms a structure with its longitudinal ends overlapped, this means, it defines a normally closed structure that can be opened longitudinally.

The procedure for the manufacture of protective tubes of the present invention has the following stages:
  The obtaining of a plurality of flat knitted fabric bands by warping via a Raschel flat type of loom; and
  Shaping said flat bands so that the longitudinal ends of each flat band join together and overlap defining a tubular shape.

In accordance with a preferred embodiment, said shaping is carried out making each one of the flat bands pass over some elements whose transversal section is gradually reduced.

By preference, said arrangement is carried out at a temperature of between 150° C. and 400° C. and said flat bands advancing in said shaping stage at a speed of between 5 and 15 meters/minute.

Said overlap between the longitudinal ends of each band is by preference made in a proportion of between 25% and 75% of the total band width.

If required, said shaping stage can be include the impregnation of the flat bands with a shaping product, that is carried out prior to the application of the heat to said bands.

By preference, said shaping product is silicone or resin.

The procedure can also include the adhesion stage of a sheet to said flat bands prior to said shaping.

By preference, said sheet is made from aluminium and polyester.

With the procedure of this present invention an easily installed protective tube is achieved, as in the assembly position it is open longitudinally and in the usage position is closed, suitable for its use in applications that require great resistance to abrasion and temperature.

Specifically, the protective tube manufacture via the procedure of the present invention has a resistance to abrasion of a minimum of 300,000 cycles, a minimum temperature resistance of 2,400 hours at 175° C., a thickness of between 0.5 and 3 mm, and a minimum internal diameter of 20 mm and a virtually limitless maximum diameter.

In comparison to the currently known protective tubes, the tube manufacture via the present invention procedure has the following advantages:
  Greater resistance to abrasion;
  Internal tube diameter and overlapped section controlled and defined by the procedure, its internal diameter being able to be practically limitless;
  The flexibility or rigidity of the tube, its ease of curvature and its rolling strength are variable in line with the types of thread used and the fabric's structures, as depending on the threads they can be arranged in a perpendicular, parallel or oblique manner, or combinations of same, against the tube's longitudinal axis.
  Superior productivity in the weaving of the bands on the Raschel knitting machines compared to flat bed knitting machines with laying of the yarn, thus meaning lower production costs;
  The possibility of obtaining fabrics with greater thickness and similar or less weight, which means better thermal and vibration insulation;
  The knitted fabric has greater flexibility and elasticity than the open weave which means better adaptation to possible irregular shapes of the element to be protected;

BRIEF DESCRIPTION OF THE DRAWINGS

In order to give a greater understanding of that stated some drawings are attached in which, several practical cases are carried out in a diagrammatic manner and by way of description but not of limitation.

DESCRIPTION OF PREFERRED EMBODIMENTS

Figure 1:
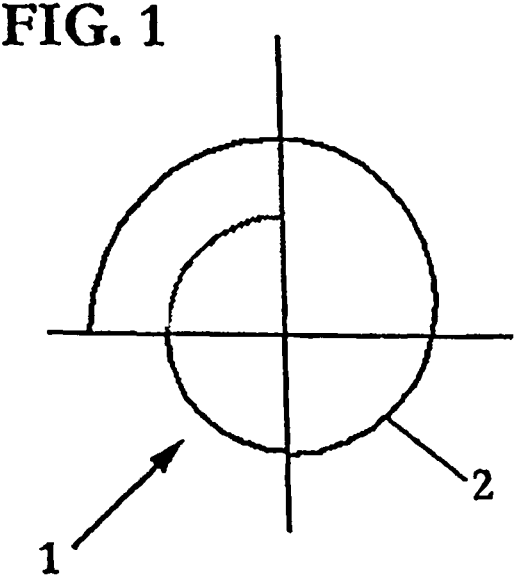
FIG. 1 is a transversal section view of a protective tube manufactured with the procedure of this present invention, that has a 25% proportion of its longitudinal ends overlapped.
Figure 2:
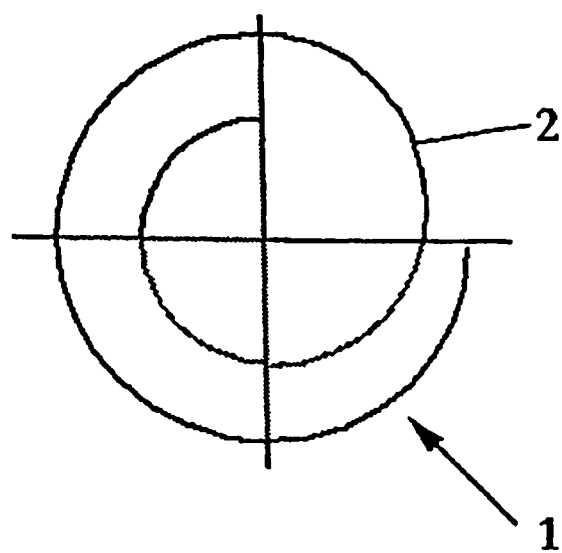
FIG. 2 is a transversal section view similar to FIG. 1, with a 75% proportion of its longitudinal ends overlapped.
Figure 3:
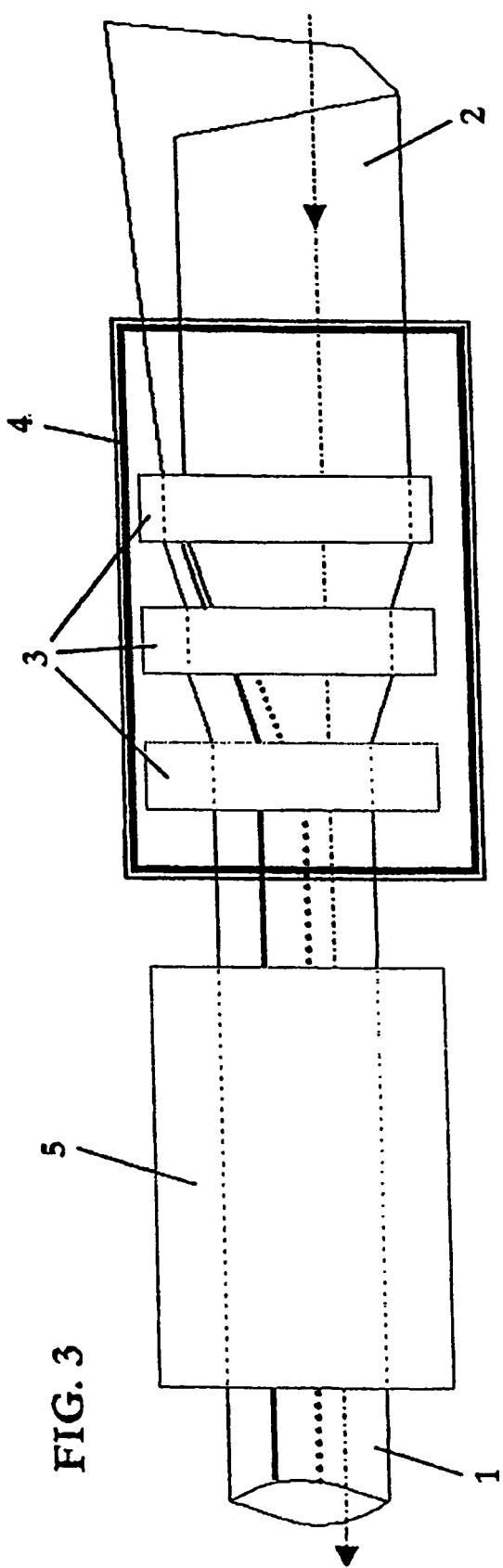
FIG. 3 is an outline drawing of the station where the shaping is carried out by heat using the present invention procedure.

In the first place it must be stated that in the present description "protective tube" is understood as the structure where the transversal section is represented in FIGS. 1 and 2. This meaning, protective tube (shown by means of the numerical reference 1) described here that is formed from a flat band and it is deformed in a way so that the longitudinal ends of same are overlapped, defining a closed structure that can be opened longitudinally.

In FIG. 1, the overlapped proportion is 25% and in FIG. 2 it is 75%.

Embodiment 1

The weaving of some bands of fabric is carried out on a Raschel loom by warp with the following characteristics:
Make: Liba
Model: Racop-06
N° of knitting heads: 1
Knitting head width: 130"
N° of combs: 6 (of which 3 form the mesh)
Gauge: 14 needles per inch
Speed: approximately 600 rows of mesh/min This type of fabric is standard and the workings and possibilities are known by any technician in the industry.

Some 25 bands of fabric are obtained simultaneously (indicated by means of reference number 2) with widths of between 50 and 200 mm with the following characteristics.
Structure of three combs with the following movements:
P-1: 2-0/0-2//linked to the stud chain
P-2: 2-4/2-0//linked to the knitting
P-3: 0-0/8-8//linked to the weft on four needles
Threading and materials of the combs:
P-1: full; polyester mono-filament (PET) with a 0.22 mm diameter or polyamide monofilament (PA) with a 0.20 mm diameter.
P-2: full; polyester (PET) multifilament 500 dtex
P-3; full; polyester (PET) monofilament 0.22 mm diameter
Longitudinal density: 6 mesh rows per cm
Transversal density: 7 mesh columns per cm With this structure, materials and weft, bands are obtained with the following properties:
High resistance to abrasion: 300,000 cycles as a minimum before breaking on Trial ARP 15-36A compared to the resistance of approximately 60,000 cycles in the same trial on bands produced with other methods. This resistance is mainly given by the PET or PA threads disposed in the P-1.
2,400 hours resistance to temperature at 175° C. without loss of mechanical properties.
1.5 mm thickness with a gram weight of 350 gr/m$^2$ which gives good thermal and sound insulating properties. This significant thickness, compared with woven fabrics that are around 0.5 mm, with a relatively low gram weight are obtained thanks to the superimposing of the structures of each one of the three combs and the fact that in P-2 'tangle' type multifilament threads have been disposed.
10% maximum longitudinal shrinkage after 4 hours at 175° C. As a result of the fact that P-1 carries out a low retraction linking of the PET (polyester) or PA (polyamide) monofilament stud chain.

The bands are likely to be subjected to a shaping stage, as the PET threads disposed in P-3 carrying out a linking of the mesh on four needles can give a tubular shape to the band in a subsequent process.

Next the bands are subjected to a shaping stage (the station being represented in FIG. 2) making them pass over some rings (3) lined up on the longitudinal axis of the band (2) and which have decreasing diameters as the band (2) advances on the inside. These rings (3) make the bands (2) fold in such a way that the two longitudinal ends converge one towards the other until first they meet and then overlap forming a tubular structure with a section that by preference is circular, although it could also have other sections such as square, triangular, oval, etc., in line with the internal section of the rings. With the diameter of the last ring (3) and the overlapped area of the two longitudinal ends of the band (2) that is approximately 50% of the total width of same, the internal diameter of the tubular (1) fabric structure is determined. This overlapped area is made by the difference between the width of the band (2) and the perimeter of the internal space of the last ring (3).

This stage is carried out in an oven (4) at a temperature of some 350° C. and a speed of band passage of some 6 meters per minute. Next the shaped tube (1) is passed through a low temperature (5) area in order to cause its rapid cooling. This achieves the polyester thread exceeding the softening temperature and then the polyester re-crystallises in such a way that it is fixed in the position in which it was when it was subjected to the rapid cooling.

This shaping stage is particularly effective thanks to the P-1 and P-2 comb linking structure in which the polyester threads are disposed. This makes the resulting tube (1) have an optimum coiling strength, flexibility and elasticity for its use on the substrate to be protected likewise its maintenance over a long period of time.

Embodiment 2

In the second preferred embodiment the following variables are introduced compared to the first:
Structure of the four combs in accordance with the following movements:
P-1: 2-0/0-2/4-6/6-4//linked to the offset stud chain
P-2: 4-6/6-4/2-0/0-2//linked to the offset stud chain
P-3: 2-4/2-0//linked to the weft
P-4: 0-0/8-8//linked to the weft on four needles Threading and materials of the combs:

P-1: 1 full-1 empty; polyester mono-filament (PET) with a 0.22 mm diameter or polyamide monofilament (PA) with a 0.20 mm diameter.

P-2: 1 full-1 empty; polyester mono-filament (PET) with a 0.22 mm diameter or polyamide monofilament (PA) with a 0.20 mm diameter.

P-3: full; polyester (PET) multifilament 500 dtex.

P-4: full; high retraction polyester (PET) monofilament 0.22 mm diameter.

The shaping phase that is subsequently carried out with the bands obtained in the weaving is the same as that described in the first preferred embodiment.

With this structure, materials and linking and subsequent to the shaping stage a tubular structure is obtained that, in addition to having the tube properties described in the first embodiment, has the following improvements:

- Increased rolling strength due to the fact that the PET threads disposed are high retraction (approximately 40% at 160° C.) in P-4. By passing the bands through a hot area in the shaping stage, these threads suffer a greater shrinkage than the rest of the threads that form the fabric's structure and on being disposed in a perpendicular position to the longitudinal axis of the band gives this bend greater strength with the two longitudinal edges coming together.
- Greater flexibility in the longitudinal direction due to the fact that on replacing the P-1 and P-2 stud chain linking structure, the threads of this comb, that are arranged in a fashion that is exclusively parallel to the longitudinal axis of the band, pass to a oblique position against this axis. By doing this the bending of the tube is achieved bringing the two transversal ends nearer to each other in such a way that the curvature radius (r) can be made smaller without producing the complete bending or collapsing of the tubular structure.

These two improvements to the tubular structure obtained in the first preferred embodiment make the product obtained in the second preferred embodiment process more suitable for use when, as a result of the curvature or irregularity nature of the substrate shape to be covered, greater rolling strength and ease of curving is required.

Embodiment 3

In the third preferred embodiment the following variables are introduced compared to the first:

Structure of the two combs in accordance with the following movements:

P-1: 2-0/0-2//linked to the offset stud chain
P-2: 0-0/6-6//linked to the weft on three needles Threading and materials of the combs:

P-1: full; fibre glass multifilament 68×2 tex.
P-2: full; fibre glass multifilament 68×2 tex.

With this linking structure, materials and weft, bands are obtained that, different to those obtained in the first and second preferred embodiments are characterised by their high resistance to temperature in such a way that said bands can support temperatures of 600° C. for 90 hours have a loss of their mechanical properties not in excess of 50%.

Figure 4:
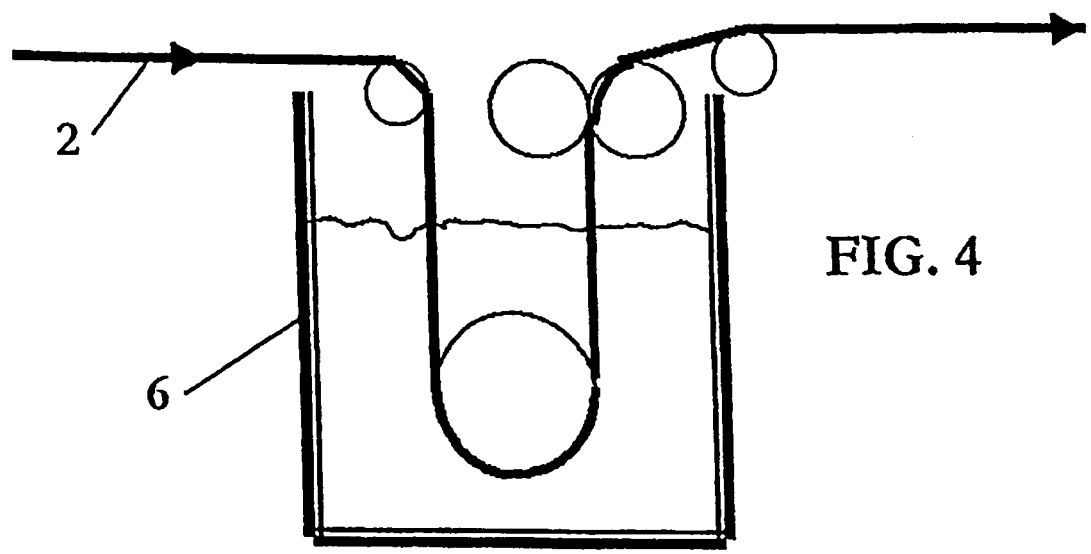
FIG. 4 is an outline drawing of the station where the impregnation of the flat bands is carried out on a shaping material.

In the shaping stage of this embodiment, the impregnation of the bands is carried out with a silicone or resin compound, such as Acrylic PR Resin from the Repsol Company. This impregnation is carried out by the immersion of the bands in a bath (6) shown in FIG. 4 that contains the silicone or resin and the subsequent removal of the excess product on passing the bands (2) over some rollers that act as a grid. Then the bands (2) pass through the shaping stage as described in Embodiment 1 with which the silicone or resin polymerises at the point when the bands acquire the tubular shape, thus this shape being fixed.

The structure obtained in the third preferred embodiment is especially preferable for the protection of conduits that are in high temperatures and at the same time act as thermal insulation being able to be used in areas where the protective tubes obtained by other processes or other materials are unusable after a few hours subjected to working temperatures.

Embodiment 4

In the fourth preferred embodiment the following variables are introduced compared to the third:

Structure of the two combs in accordance with the following movements:

P-1: 2-0/0-2//linked to the stud chain
P-2: 6-6/0-0//linked to the weft on three needles
P-3: 0-0/6-6//linked to the weft on three needles Threading and materials of the combs:

P-1: full; stainless steel multifilament 127×2 tex.
P-2: full; fibre glass multifilament 68×2 tex.
P-3: full; fibre glass multifilament 68×2 tex.

With this linking structure, materials and weft, bands are obtained that, in addition to the thermal insulation and resistance properties, offer some values of resistance to friction that are extremely high given by the fact that in P-1, which carries out the linking of the stud chain, 316L stainless steel 127×2 tex multifilament threads are incorporated from the Sprint Metal company and in P-2 and P-3 the mesh links are made on three needles with opposite movements.

The tubular structure obtained in this embodiment is especially suitable in the cases in which combined high thermal resistance and abrasion have to be obtained.

Embodiment 5

In the fifth preferred embodiment the following variables are introduced compared to the first:

Structure of the four combs in accordance with the following movements:

P-1: 2-0/0-2//linked to the stud chain
P-2: 2-0/2-4/4-6/4-2//atlas linking
P-3: 4-6/4-2/2-0/2-4//atlas linking
P-4: 0-0/8-8//linked to the weft on four needles Threading and materials of the combs:

P-1: full; polyester mono-filament (PET) with a 0.22 mm diameter or polyamide monofilament (PA) with a 0.20 mm diameter.

P-2: full; polyester multifilament (PET 80%) and stainless steel (INOX 20%) 820 dtex.

P-3: full; polyester multifilament (PET 80%) and stainless steel (INOX 20%) 820 dtex.

P-4: full; polyester multifilament (PET) and monofilament 0.22 mm diameter.

The shaping phase that is subsequently carried out with the bands obtained in the weaving is the same as that described in the first preferred embodiment.

With this structure, materials and weft bands and subsequent to the shaping stage, tubular structures are obtained that, in addition to having the tube properties described in the first embodiment, have the following improvements:

Screening effect for electromagnetic radiation as a result of the fact that P-2 and P-3 have polyester multifilament threads twisted with Politex Inox Resistex 80% PET+20% INOX 820 dtex stainless steel filaments made by the Tecnofilati Company and the fact that the two combs carry out an atlas type crossed link on three needles. The combination of the high electrical conductivity of these threads with the high covering factor of the fabric by the linking carried out makes a tubular structure that is especially suitable to protect and screen electrical cables likely to be affected by electromagnetic radiation (EMI).

Embodiment 6

Figure 5:
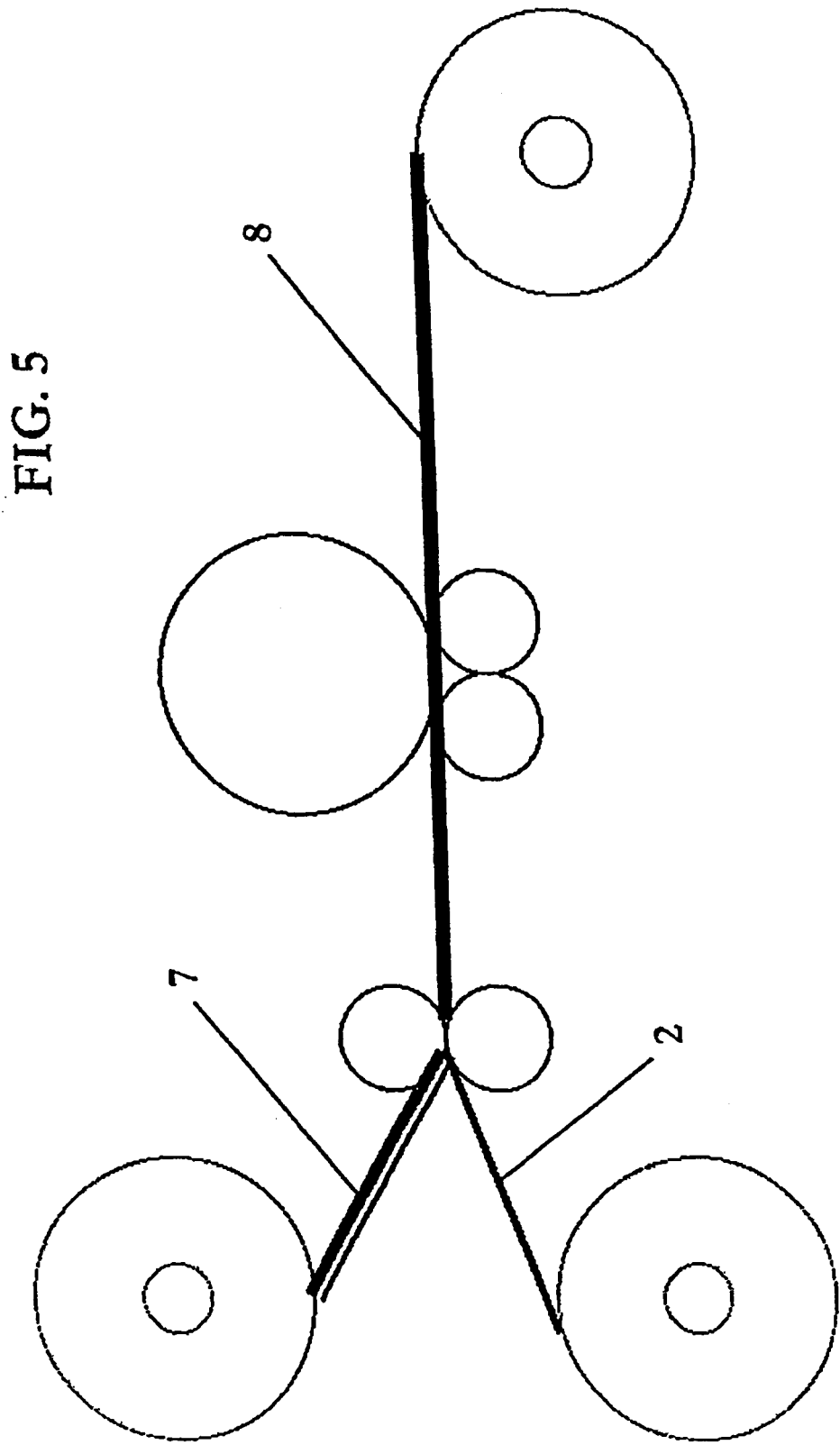
FIG. 5 is an outline drawing of the adhesion station for sheets where to said flat bands.

In the sixth preferred embodiment the following variables are introduced compared to the first:
Longitudinal density: 4 mesh rows per cm
Transversal density: 3.5 mesh rows per cm
Structure of two combs with the following movements:
P-1: 2-0/0-2//linked to the stud chain
P-2: 0-0/8-8//linked to weft on four needles
Threading and materials of the combs:
P-1: full; polyester mono-filament (PET) with a 0.22 mm diameter or polyamide monofilament (PA) with a 0.20 mm diameter.
P-2: full high retraction; polyester mono-filament (PET) with a 0.22 mm diameter.
A sheet of an aluminium-polyester compound (7) is applied subsequent to the weaving of the bands which is adhered to them by means of welds (FIG. 5), although other means can be used for this adhesion such as gluing.
The shaping stage that is subsequently carried out, with the band compound of the fabric-aluminium sheet (8) obtained, is the same as that described in the first preferred embodiment.
In this case the structure of the band, with the stud chain and weft links in P-1 and P-2 respectively, likewise the exclusive use of monofilament thread, is optimal to achieve a an aluminium sheet support fabric which has maximum mechanical resistance with minimum cost.
The resulting tubular structure, after the shaping stage, with the aluminium sheet on the inside or the outside of the tube to achieve a high screening effect is particularly suitable to protect and screen electrical cables likely to be affected by electromagnetic radiation (EMI).

Embodiment 7

In the seventh preferred embodiment the following variables are introduced above the first embodiment
Structure of four combs with the following movements:
P-1: 2-0/0-2//linked to the stud chain
P-2: 2-4/2-0//linked to the knitting
P-3: 20-0/8-8//linked to the weft on four needles
P-4: 0-0/8-8/0-0/2-2//linked to the weft on four needles alternating with weaving link on two needles.
Threading and materials of the combs:
P-1: full; polyester mono-filament (PET) with a 0.22 mm diameter or polyamide monofilament (PA) with a 0.20 mm diameter.
P-2: full; polyester (PET) multifilament 500 dtex.
P-2: full (except in the opening area and the band); polyester (PET) monofilament 0.22 mm diameter.
P-4: full (except in the opening area and the band); polyester (PET) monofilament 0.22 mm diameter.

Figure 6:
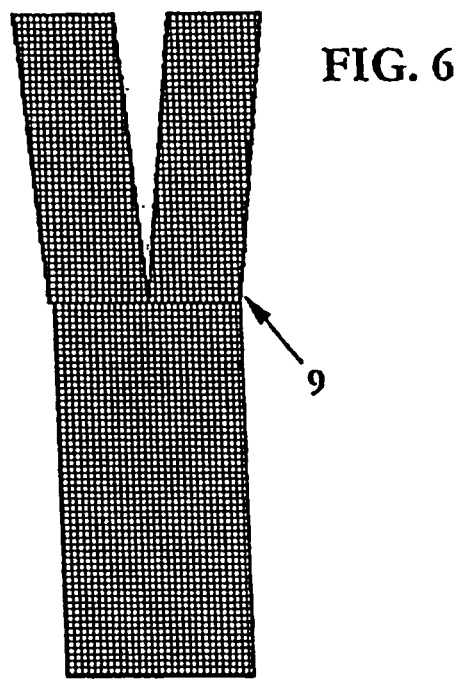
FIG. 6 is a plan view of a tube manufactured by means of the procedure of this present invention in the form of a Y.
Figure 7:
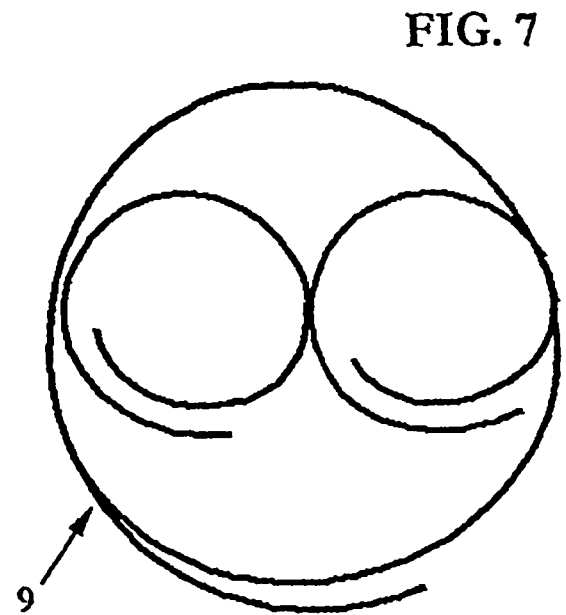
FIG. 7 is a transversal section view of the tube made in FIG. 6.

The shaping phase that is subsequently carried out with the bands obtained in the weaving is the same as that described in the first preferred embodiment.
With this four comb linking structure a band (9) is obtained with a central longitudinal opening in the shape of a Y, shown in FIGS. 6 and 7, it being possible to programme the length of the unit part and the starting point in line with the loom drawing.
In this way, after converting the flat band into a tubular structure in the shaping stage, a protective covering is obtained with properties described in the first preferred embodiment, but with the peculiarity that it is optimal for its fitting on conduits or cabling with a Y shape.
In spite of making reference to a specific embodiment of the invention, it is clear to an expert in the industry that the procedure described is capable of numerous variations and modifications, and that all of the details stated can be replaced by others that are technically equivalent, without moving away from the sphere of the protection defined by the attached claims.

The invention claimed is:

1. A method for the manufacture of protective tubes, comprising:
obtaining a plurality of flat knitted fabric bands, comprising polyester threads via a Raschel flat type of loom fitted with a plurality of combs;
shaping the flat knitted fabric bands so that longitudinal ends of each band join together and overlap, wherein the polyester threads of the flat knitted fabric are disposed in P-1 comb and P-2 comb linking structure using three of said combs (P-1, P-2, and P-3); and
providing an overlap of the longitudinal ends extending over between 50% and 75% of a total width of the bands.

2. The method according to claim 1, wherein the P-1 comb linking structure handles polyester monofilaments while the P-2 comb linking structure handles polyester multifilament 500 dtex.

3. The method according to claim 1, wherein movements of the P-1 and P-2 combs are for P-1: linked to stud chain, and for P-2: linked to knitting.

4. The method as in claim 1, 2 or 3, wherein the shaping is carried out by making each one of the flat bands pass through some elements whose transversal section is gradually reduced.

5. The method as in claim 1, 2 or 3, wherein the shaping is carried out at temperatures between 150 degrees C. and 400 degrees C.

6. The method according to claim 4, wherein the flat bands advance in a shaping stage at an approximate speed of between 5-15 meters/minute.

7. The method as in claim 1, 2 or 3, wherein the shaping stage includes impregnation of the flat bands with a shaping product.

8. The method according to claim 7, wherein the shaping product is silicone or resin.

9. The method as in claim 1, 2 or 3, further comprising a stage for adhesion of a sheet to the flat bands prior to the shaping.

10. The method according to claim 9, wherein the sheet is made of aluminum and polyester.

* * * * *